Figure 1:
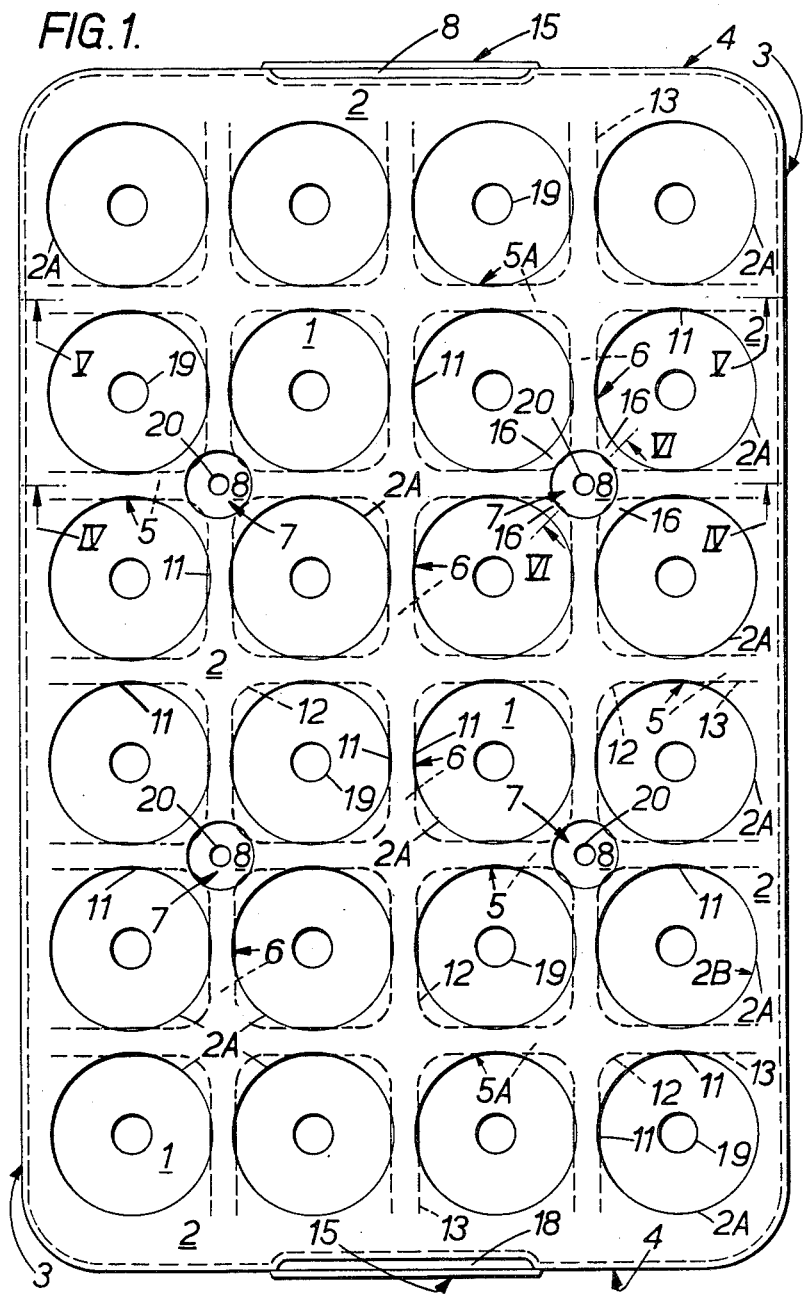

Nov. 30, 1965  E. R. MARTIN  3,220,596
HOLLOW MOULDED CRATE
Filed Dec. 4, 1962  2 Sheets-Sheet 1

INVENTOR
Edward Rankine Martin
BY Robert U. Geib, Jr.
ATTORNEY

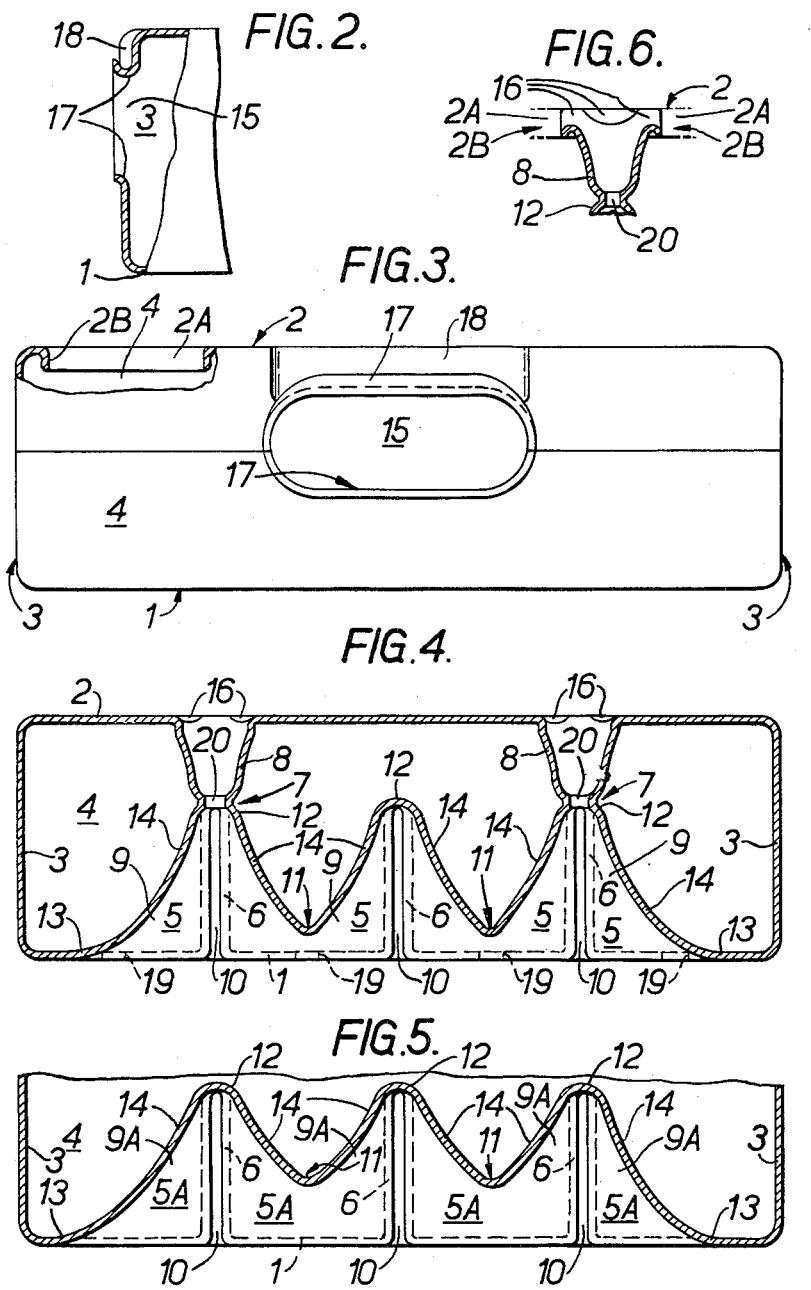

United States Patent Office 3,220,596
Patented Nov. 30, 1965

3,220,596
HOLLOW MOULDED CRATE
Edward Rankine Martin, Arkley, near Barnet, England, assignor, by mesne assignments, to Phillips Petroleum Company, a corporation of Delaware
Filed Dec. 4, 1962, Ser. No. 242,155
Claims priority, application Great Britain, Feb. 1, 1962, 3,899/62
3 Claims. (Cl. 220—21)

This invention relates to bottle crates moulded in plastic and it is an object of this invention to provide an improved plastic bottle crate.

According to this invention a bottle crate is characterised in that it is made of thermoplastic material and is further characterised in that it is provided with bottle separating means. The crate is preferably an integral structure moulded in one piece. The bottle separating means may comprise apertures in the top wall of the crate, or they may be provided inside the crate, that is by integral formations in the bottom wall of the crate, or by a separately formed structure inserted within the crate. The bottle separating means may comprise a combination of apertures in the top wall and means inside the crate. The integral bottle separating formations may be inward projections from the bottom wall, or inward projections from both the bottom and the top walls. The inward projections from both walls may join together to form pillars extending from bottom wall to top wall. The bottle crate of the invention is preferably made by blow-moulding. Integral carrying formations or handles may also be formed during moulding of the crate.

Although inward projections have been described above as extending from bottom wall to top wall, in another form of the invention such projections could extend from one wall into proximity with, but not normally in contact with, the other wall, thereby permitting a limited amount of deflection.

The inward projections are preferably in the form of deep, narrow impressions of closed configuration. Some of the impressions may be of greater depth than others, for the purpose of reinforcing the bottoms of bottles against inward movement, preferably bottles adjacent the carrying formations or handles, if these are included.

If the crate is provided with bottle separating apertures in the top wall, each aperture preferably has its periphery formed with a depending skirt. This skirt may be subdivided, by slitting for example, to provide bottle-gripping tongues.

In another form of the invention the top of the crate is open and the inward projections or impressions are of sufficient height to separate and locate the bottles without the need for bottle separating apertures in the top wall.

One embodiment of the invention will now be described in more detail by way of example, with reference to the accompanying drawings, in which:

FIGURE 1 is a top plan;
FIGURE 2 is a partial side elevation, partly broken away and in section;
FIGURE 3 is an end elevation, partly broken away and in section;
FIGURE 4 is a section on the plane IV—IV of FIGURE 1;
FIGURE 5 is a partial section on the plane V—V of FIGURE 1; and
FIGURE 6 is a partial section on the plane VI—VI of FIGURE 1.

The embodiment of a plastic bottle crate now to be described and in accordance with the invention, is an integral structure, formed by blow moulding an extruded tubular thermoplastic parison in a two-part mould. The blow-moulding technique is well known per se and need not be described here, apart from stating that it is desirable in this case to commence blowing just before the mould parts meet to form the closed mould.

Referring now to the drawings, the crate has a bottom wall 1, a top wall 2, two side walls 3, and two end walls 4. The top wall is formed with twenty four holes 2A, since this embodiment of crate is designed to receive twenty four bottles, which rest on the bottom wall 1 and project up through the apertures, which act to keep the bottles separate from one another. Each hole 2A is formed with a depending skirt 2B (FIGURE 3).

Further separation of the bottles is achieved by a series of internal walls 5 and 6 being at right angles to the bottom wall 1, walls 5 being at right angles to walls 6. These walls 5 and 6 (apart from two walls 5A adjacent each end of the crate) have the shape shown in the centre portion of FIGURE 4. Referring to FIGURES 1 and 4, at four intersections 7 of walls 5 and 6, the walls, which project inwardly from the bottom wall, are met by downward projections 8 from the top wall, to form four pillars which maintain the correct spacing between the top and bottom walls and generally reinforce the structure as a whole.

Walls 5, 6 and 5A (see FIGURES 4 and 5) have deep slots 9, 10 and 9A respectively, produced by one mould tool during the blow-moulding operation.

Thus each bottle (apart from those adjacent the side or end walls) is surrounded by four wall parts which form a separate compartment for the bottle. Referring to FIGURE 4, each such wall part has a central low point or valley 11, and two high points 12. At the four intersections 7 the high points 12 merge with the downward projections 8.

At each end, walls 5, 6 and 5A merge into the bottom wall, as indicated at 13.

The shape of the walls 5, 6 and 5A is such as not only to separate the bottles, but also to ensure that, if a bottle is not inserted exactly vertically downward into the crate, its bottom will strike one of the sloping portions 14 of the walls and be deflected into its proper position.

FIGURE 5 shows that, in the two walls 5A adjacent the end walls 4 of the crate, the low points or valleys 11 are not as low as those of the walls 5, see FIGURE 4. The purpose of this is to prevent inward movement of the two bottles at each end adjacent handle apertures 15, since it is usual for the projecting neck of one or more of those four bottles to be grasped when the full crate is being handled.

Referring to FIGURE 6, it will be noted that at each of the four intersections 7, the four portions 16 of the top wall 2 which lie between the projections 8 and the holes 2A, are depressed.

Referring to FIGURE 3, one of the depending skirts 2B of the holes 2A is seen in section. These skirts 2B add to the strength of the top wall 2, and can be used in some instances to grip the bottles.

FIGURE 2 shows a handle aperture 15 having rounded lips 17. Above the handle aperture the end wall is recessed at 18.

There are drain holes 19 in the bottom wall 1 at each bottle location, and there are drain holes 20 at the bottom of each downward projection 8 at the four intersections 7.

Although only four intersections 7 are shown, it will be understood that a crate could have more than four, and in fact there could be downward projections 8 at every intersection of walls 5, 5A and 6.

The holes 2A, 19, 20 are all cut out after the blow moulding operation.

The handle apertures 15 are preferably formed during the blow-moulding operation, using cores.

What I claim is:
1. A crate for bottles and similar articles comprising

(a) an integral molded in one piece thermoplastic structure having a top wall, a bottom wall and an integrally formed substantially continuous side wall defining the sides of said crate;
(b) a plurality of bottle receiving apertures in said top wall;
(c) bottle separating means inside said crate comprising upwardly displaced portions of said bottom wall, said upwardly displaced portions being adapted to engage the base of a bottle and thus position the same;
(d) said upwardly displaced portions being located within said crate so that bottles placed away from the side wall of the said crate will be engaged at at least four points and bottles located adjacent the said side wall will be engaged at at least two points by said upwardly displaced portions; and
(e) said upwardly displaced portions of said bottom wall comprising a series of parallel hollow walls at right angles to another series of parallel hollow walls, each of said parallel walls being substantially at right angles to said bottom wall, forming four-sided compartments for the bottles, each side of each compartment having one low point and two high points, the low points being connected to the high points by sloping lines, said high points corresponding to wall intersections of said compartments.

2. A crate according to claim 1 wherein at least one of said high point intersections meets a downward projection from said top wall to provide reinforcement between said top wall and said bottom wall.

3. A crate according to claim 2 wherein four of said high point intersections meet four downward projections from said top wall.

References Cited by the Examiner

UNITED STATES PATENTS

| 1,948,041 | 2/1934 | McCowan | 220—21 |
| 2,063,390 | 12/1936 | Lindell | 220—21 |
| 2,414,171 | 1/1947 | Scharff. | |
| 2,526,716 | 10/1950 | Wales | 220—21 |
| 2,574,983 | 11/1951 | Reed | 220—21 |
| 2,619,251 | 11/1952 | Schmidt | 220—21 |
| 2,974,819 | 3/1961 | Melville. | |
| 3,151,762 | 10/1964 | Vidal | 220—21 |

FOREIGN PATENTS 1,170,638    1/1959    France.

THERON E. CONDON, *Primary Examiner.*